(12) United States Patent
Rohra

(10) Patent No.: US 12,483,734 B1
(45) Date of Patent: Nov. 25, 2025

(54) SYSTEM AND METHOD FOR REAL-TIME VIDEO STREAMING OF TRANSPORTATION INFORMATION

(71) Applicant: Prakash Rohra, Mumbai (IN)

(72) Inventor: Prakash Rohra, Mumbai (IN)

(*) Notice: Subject to any disclaimer, the term of this patent is extended or adjusted under 35 U.S.C. 154(b) by 0 days.

(21) Appl. No.: 19/191,397

(22) Filed: Apr. 28, 2025

(30) Foreign Application Priority Data

Jan. 16, 2025 (IN) .............................. 202521003805
Apr. 28, 2025 (IN) .............................. 202521040992

(51) Int. Cl.
H04N 21/2187 (2011.01)
G06Q 50/40 (2024.01)
H04N 21/431 (2011.01)
H04N 21/432 (2011.01)
H04N 21/485 (2011.01)

(52) U.S. Cl.
CPC ......... *H04N 21/2187* (2013.01); *G06Q 50/40* (2024.01); *H04N 21/4316* (2013.01); *H04N 21/432* (2013.01); *H04N 21/4856* (2013.01)

(58) Field of Classification Search
CPC ........... H04N 21/2187; H04N 21/4316; H04N 21/432; H04N 21/4856; G06Q 50/40
See application file for complete search history.

(56) References Cited

U.S. PATENT DOCUMENTS 8,046,293 B2  10/2011  Sireau
9,171,476 B2  10/2015  White et al.
11,610,610 B1 * 3/2023  Vajpayee ................ G11B 27/10

(Continued)

OTHER PUBLICATIONS

Alghadeir, Abdullah and Sakran, Hasan Al—, Smart Airport Architecture Using Internet of Things (Sep. 30, 2016). International Journal of Innovative Research in Computer Science & Technology (IJIRCST) ISSN: 2347-5552, vol. 4, Issue-5, Sep. 2016. Available online: [https://www.ijirest.org/DOC/6_irp5163f09b717-c1df-42c0-ada9-a38fa1f3bfe0.pdf].

(Continued)

*Primary Examiner* — Kyu Chae
(74) *Attorney, Agent, or Firm* — The Roy Gross Law Firm, LLC; Roy D. Gross (57) ABSTRACT

Disclosed is a system (100) and method (200) for real-time video streaming information relating to transportation that comprises a user device (127) that allows users to access live updates. Users input queries, specifying a preferred location and language, through typed-text or voice-commands, with the system automatically detecting the language via a multi-lingual module (106). The data acquisition module (101) retrieves raw transportation data, including schedules, delays, and hub assignments, from service provider servers, storing it in a real-time database (102). The data processing module (104), aided by the multi-lingual module (106), processes and translates the data into the user's preferred language. The content generation module (108) produces visual schedules, 3D overlays, and voiceovers, which the screen capturing module (114) transforms into low-latency streams. The multi-platform streaming module (122) broadcasts these streams to digital platforms in a news-feed format, delivering culturally relevant, real-time updates within a 6-hour window, displayed on the user device (127) for seamless access across various platforms.

18 Claims, 6 Drawing Sheets

(56) References Cited

U.S. PATENT DOCUMENTS

| | | | |
|---|---|---|---|
| 12,101,529 B1* | 9/2024 | Wu | G06T 5/70 |
| 2004/0117831 A1* | 6/2004 | Ellis | H04N 21/812 |
| | | | 348/E7.071 |
| 2016/0300164 A1 | 10/2016 | Dailly et al. | |
| 2020/0357293 A1* | 11/2020 | Jiang | G08G 5/51 |
| 2021/0210053 A1* | 7/2021 | Ng | G09G 5/14 |
| 2022/0129123 A1* | 4/2022 | Nair | G06F 8/38 |
| 2022/0180440 A1 | 6/2022 | Taylor et al. | |
| 2022/0215760 A1* | 7/2022 | Jorgensen | G08G 5/52 |
| 2023/0015284 A1* | 1/2023 | Khoury | G06Q 30/018 |
| 2024/0040171 A1* | 2/2024 | Chen | H04N 21/234363 |
| 2024/0333784 A1* | 10/2024 | Reznik | H04L 65/612 |
| 2024/0430497 A1* | 12/2024 | Su | H04N 21/2343 |

OTHER PUBLICATIONS

Roberts, Pasha (2005). Information visualization of the stock market tick :toward a new trading interface [Master of Science, Massachusetts Institute of Technology], 83pp.

* cited by examiner

```
3.01   // Pseudo-code for Real-Time Video Streaming of Transportation Schedules
3.02   // 1. Receive user query
3.03   user_query = receive_user_query()
3.04   // 2. Fetch transportation data
3.05   transportation_data = fetch_transportation_data(user_query)
3.06   // 3. Process transportation data
3.07   processed_data = process_transportation_data(transportation_data)
3.08   // 4. Generate content in preferred language
3.09     content = generate_content(processed_data, user_query)
3.10   // 5. Broadcast video streams
3.11   video_stream = prepare_video_stream(content)
3.12   broadcast_video_stream(video_stream, user_query)
3.13   // 6. Display video on user device
3.14   display_video_stream_on_device(video_stream, user_query)
3.15   // Function to fetch transportation data based on user query
3.16   function fetch_transportation_data(query):
3.17     // Secure connection and fetch raw data
3.18     server_connection = establish_secure_connection()
3.19     raw_data = fetch_data_from_server(query, server_connection)
3.20     return raw_data
3.21   // Function to process transportation data
3.22   function process_transportation_data(data):
3.23     // Preprocess and filter data
3.24     filtered_data = filter_data(data)
3.25   categorized_data = categorize_data(filtered_data)
3.26   return categorized_data
```

FIG. 3A

```
3.27   // Function to generate content (visual, interactive, and multilingual)
3.28   function generate_content(data, query):
3.29   // Generate visual representation and apply localization
3.30   content = create_visual_schedule(data)
3.31   content = add_interactive_elements(content)
3.32   content = apply_multilingual_translation(content, query)
3.33   return content
3.34   // Function to prepare video stream with low latency
3.35   function prepare_video_stream(content):
3.36   // Capture content at adaptive intervals and augment with overlays
3.37   video_stream = capture_video(content)
3.38   video_stream = add_dynamic_overlays(video_stream)
3.39   return video_stream
3.40   // Function to broadcast video streams to digital platforms
3.42   function broadcast_video_stream(video_stream, query):
3.43   platforms = get_supported_platforms(query)
3.44   foreach platform in platforms:
3.45   broadcast(video_stream, platform)
3.46   // Function to display video stream on user device
3.47   function display_video_stream_on_device(video_stream, query):
3.48   device = get_user_device(query)
3.49   display_on_device(video_stream, device)
```

SYSTEM AND METHOD FOR REAL-TIME VIDEO STREAMING OF TRANSPORTATION INFORMATION

This complete specification claims priority from the previously filed application in India, being 202521003805 dated 16 Jan. 2025, and it is submitted the claims appended to this application are fairly based on the matter disclosed in 202521003805 and dated 16 Jan. 2025 which is incorporated herein by reference in its entirety.

FIELD

The present disclosure relates to the field of real-time data dissemination and streaming technology. More particularly focused on information relating to transportation, to improve the passenger experience.

Definition

As used in the present disclosure, the following terms are generally intended to have the meaning as set forth below, except to the extent that the context in which they are used indicates otherwise.

WebRTC (Web Real-Time Communication): The term "WebRTC" refers to an open-source protocol and technology enabling real-time, peer-to-peer audio, video, and data transmission over the internet without requiring intermediary servers for media streaming.

Custom RTMP (Real-Time Messaging Protocol): The term "Custom RTMP" refers to a tailored implementation of the RTMP protocol, originally developed by Adobe, for streaming audio, video, and data over the internet with low latency.

DRM (Digital Rights Management): The term "DRM" refers to an DRM encompasses technologies and methods used to protect digital content from unauthorized access, copying, or distribution by enforcing access controls and encryption.

H.264 (Advanced Video Coding): The term "H.264", also known as MPEG-4 Part 10, is a widely used video compression standard that efficiently reduces file sizes while maintaining high visual quality.

H.265 (High Efficiency Video Coding): The term "H.265" or HEVC refers an advanced video compression standard succeeding H.264, offering superior compression efficiency for higher resolution content with reduced bandwidth requirements.

VP9: The term "VP9" refers to an open-source video codec developed by Google, configured for high-efficiency compression and quality, particularly suited for web streaming and 4K content.

RESTful API Calls: The term "RESTful API calls" refers to requests made over the internet using Representational State Transfer (REST) principles, enabling communication between systems to retrieve, update, or manage data. These calls utilize standard HTTP methods, such as GET, POST, PUT, and DELETE, to access resources identified by uniform resource identifiers (URIs), typically returning data in formats like JSON or XML, facilitating efficient and scalable data exchange.

Transportation Modes: The term "transportation modes" means the distinct categories of travel facilitated by the system, encompassing road (e.g., buses, trains, trucks), marine (e.g., ships, ferries, boats), taxi services (e.g., ride-hailing, cabs, shuttles), and air (e.g., flights, private aircraft, helicopters, air taxis). Each mode involves the operation of vehicles, vessels, or aircraft managed by an operator to transport passengers or goods, with associated data such as schedules, routes, and real-time positions accessible for generating digital content and video streams.

Travel Hub: The term "travel hub" means a centralized facility or location where transportation operations across multiple travel modes, including but not limited to road (e.g., bus terminals, train stations), marine (e.g., ports, ferry terminals), taxi services (e.g., dispatch centres), and air (e.g., airports), converge to facilitate passenger movement, vehicle or vessel operations, or logistics coordination. A travel hub serves as a node for accessing real-time transportation data, enabling users, particularly passengers, interactions such as searches by operator or travel hub name, and supporting the display of route-specific information or tracker streams on various devices.

Operator: The term "operator" means an entity, organization, or company responsible for managing, operating, or providing transportation services across one or more travel modes, including but not limited to road (e.g., bus companies, train services), marine (e.g., shipping lines, ferry services), taxi services (e.g., ride-hailing companies, taxi fleets), and air (e.g., airlines). An operator oversees the scheduling, operation, and tracking of vehicles, vessels, or aircraft, and may be identified in users, particularly passengers' interactions, such as searches by operator or travel hub name, to access route-specific information or tracker streams.

Kiosk: The term "kiosk" means an interactive, electronic terminal or device, typically equipped with a touchscreen, voice command capabilities, or other input methods, deployed at a travel hub or similar location, configured to display real-time digital content and video streams generated by the system Preferred Location: The term "Preferred Location" refers to a user-defined setting that specifies both the departure and arrival locations within a transportation system. This setting allows users to input their starting point (departure location) and destination (arrival location) to receive relevant information, such as schedules, available routes, and transportation options. By selecting preferred locations, users can tailor the system's outputs to reflect their specific travel needs, optimizing their experience based on the chosen points of interest.

The above definitions are in addition to those expressed in the art.

BACKGROUND

The background information herein below relates to the present disclosure but is not necessarily prior art.

The transportation industry produces an extensive array of real-time data, encompassing schedules, status updates, and operational details for vehicles, vessels, and flights, which are vital for travellers, travel hub staff, and other stakeholders. Traditionally, this information has been shared through static displays like flight information display systems (FIDS) at travel hubs or via text-based updates on websites and mobile apps. However, these conventional methods struggle to address the growing demands of a diverse, global audience. A key challenge is the inability to deliver timely and visually appealing updates to passengers across various locations and devices. Current systems often depend on manual updates or infrequent refreshes, resulting in delays that fail to reflect real-time changes, such as flight delays, gate adjustments, or other critical updates, leaving users with outdated or incomplete information.

Prior art in this field includes systems that broadcast airline information through a dedicated television channel. These systems feature a master flight repository that stores flight schedules, airline details, and airport information, which can be accessed via password-protected terminals at airline offices. Flight operation managers can view and modify schedules as needed. The system also integrates with telecast control panels and satellite uplink transmitters to broadcast updated flight information.

Moreover, there is an increasing demand for more interactive experiences that go beyond text-based lists, yet existing technologies struggle to integrate such enhancements without compromising performance or accessibility. These shortcomings highlight a need for improved techniques in the processing and dissemination of real-time transportation data. Addressing these issues could enhance the efficiency of information delivery, improve passenger satisfaction, and provide greater flexibility in how such data is accessed and understood across varied contexts.

Therefore, there is a need for a system and method for real-time video streaming information relating to transportation that alleviates the aforementioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system for real-time video streaming of transportation information.

Another object of the present disclosure is to provide a system that delivers up-to-date transportation information, especially for passengers, addressing the shortcomings of conventional methods by ensuring timely access to schedules and updates.

Yet another object of the present disclosure is to enhance accessibility by offering information in a user-friendly format that caters to diverse passenger preferences, including support for multiple languages and adaptable display options across various settings.

Still another object of the present disclosure is to enable real-time updates across all transportation modes—air, rail, road, and marine—delivering personalized and engaging content tailored to individual needs.

Still another object of the present disclosure is to provide personalized and accessible features, such as easy-to-read dashboards and real-time trackers, with multi-language audio and text options to serve a wide range of passengers.

Yet another object of the present disclosure is to ensure efficient service during busy travel periods, making travel information readily available to handle high demand without inconvenience.

Still another object of the present disclosure is to create visually appealing and interactive content that presents transportation details, such as schedules and delays, in multiple languages for a better travel experience.

Yet another object of the present disclosure is to provide instant updates on rapidly changing travel conditions, keeping passengers informed with minimal delay.

Still another object of the present disclosure is to allow customization of travel information presentation based on user roles, such as travellers, airport staff, or transportation operators, to meet specific needs.

Yet another object of the present disclosure is to ensure the safety and reliability of travel information as it is shared with passengers across various locations.

Other objects and advantages of the present disclosure will be more apparent from the following description, which is not intended to limit the scope of the present disclosure.

SUMMARY

The present disclosure provides a system and method for real-time video streaming of transportation information, the user device enabling users to input a query, including a preferred location and a preferred language, through a user device to retrieve and display live video streams of transportation schedules.

The system includes a data acquisition module that establishes secure connections with service provider servers to fetch raw transportation data, such as schedules, hub assignments, vehicle types, delays, and cancellations, storing this data in a real-time transportation database.

A data processing module preprocesses the raw data using AI-based anomaly detection to eliminate inconsistencies and errors, filters it based on transportation mode and schedule window, segments it by provider, hub, and assignments, and matches it to the user's query. A multi-lingual module translates and localizes the processed data into the user's preferred language, ensuring contextual accuracy and cultural relevance through natural language processing and machine translation.

A content generation module, in collaboration with the multi-lingual module, generates digital content representing the preferred location in the user's preferred language, automatically detected from device settings, user profiles, or query context. The content includes visual schedules, real-time clocks, operator branding, interactive controls, 3D route overlays, and personalized passenger information, with the multi-lingual module enabling real-time translation and localization of text and visual elements.

A screen capturing module captures the digital content as low-latency live video streams, augmenting them with overlays like AR/VR visuals and dynamic advertisements, and integrates background audio with contextual voiceovers in the user's preferred language, as processed by the multi-lingual module.

A multi-platform streaming module broadcasts these streams to digital platforms, including social media, OTT platforms, kiosks, TVs, and smart devices, using low-latency protocols like WebRTC and custom RTMP configurations, with edge computing for reduced latency and enhanced scalability. The streams are presented in a continuously updating news feed format with scrolling text, animated transitions, and real-time schedule updates within a six-hour window, tailored to the user's query and delivered in their preferred language via the multi-lingual module for accurate translation and cultural adaptation.

Optionally, an encoding and streaming preparation module encodes streams into formats like H.264, H.265, and VP9, segments them for adaptive bitrate streaming, and secures them with encryption and blockchain-based integrity verification.

A monitoring and scalability module tracks streaming performance, network traffic, and user engagement, implements auto-scaling based on predictive analysis, and uses AI-driven self-healing algorithms to address streaming anomalies.

The method involves receiving a query, fetching and processing transportation data, generating and capturing digital content with the multi-lingual module ensuring language and cultural accuracy, broadcasting low-latency streams, and displaying them on the user device. The system automatically delivers user-specific content in the preferred language without manual selection, leveraging the multi-lingual module for seamless translation and localization.

BRIEF DESCRIPTION OF THE ACCOMPANYING DRAWING

A system and method for real-time video streaming of transportation information, of the present disclosure will now be described with the help of the accompanying drawing in which.

LIST OF REFERENCE NUMERALS

100—System
101—Data acquisition module
102—Real-time transportation database
104—Data processing module
106—Multi-lingual module
108—Content generation module
114—Screen capturing module
118—Encoding and streaming preparation module
119—Video stream formats (H.264, H.265, and VP9 formats)
122—Multi-platform streaming module
124—Monitoring and scalability module
127—User device
200-212: Method and method step

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof.

When an element is referred to as being "engaged to," "connected to," or "coupled to" another element, it may be directly engaged, connected, or coupled to the other element. As used herein, the term "and/or" includes any and all combinations of one or more of the associated listed elements. With the increasing reliance on real-time transportation information, users require efficient, reliable, and up-to-date solutions to access transportation schedules across various platforms. Live video streaming of transportation schedules is a modern approach to enhance user experience by providing dynamic, interactive, and localized content in real-time. The system described herein aims to address these needs by offering a comprehensive solution that retrieves, processes, and broadcasts live video streams of transportation schedules based on user queries. The system integrates various modules to provide seamless access to transportation data, personalized content, and low-latency streaming across multiple platforms, ensuring that users are always informed and connected to the transportation network.

Therefore, the present disclosure envisages a system and a method for real-time video streaming of transportation information (hereinafter referred to as system (100), method (200)). The present disclosure is explained with reference to FIGS. 1 to 5.

Figure 1:
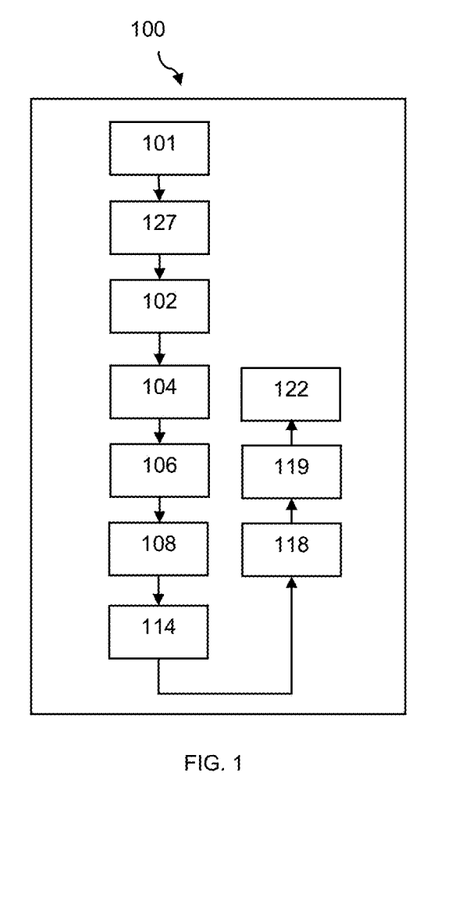
FIG. 1 illustrates a block diagram of the system for real-time video streaming of transportation, in accordance with an embodiment of the present disclosure.

Referring to FIG. 1, the present disclosure provides a system (100) for real-time video streaming of transportation information. The system (100) comprises several interconnected modules that work collaboratively to deliver real-time video streaming of transportation schedules. These modules include the user device (127), data acquisition module (101), data processing module (104), content generation module (108), screen capturing module (114), multi-platform streaming module (122), encoding and streaming preparation module (118), monitoring and scalability module (124), and the real-time transportation database (102). Each of these modules plays a critical role in ensuring the efficiency, accuracy, and smooth operation of the system, from data acquisition and processing to the delivery of live video streams across multiple platforms, all while maintaining low latency and high scalability.

The user device (127) is the primary interface for users to interact with the system (100), enabling input of queries specifying a preferred location and language to retrieve real-time transportation schedule video streams. Queries can be entered via typed text through a keyboard or touchscreen or via voice commands processed by a voice recognition module using automatic speech recognition and natural language processing to transcribe and parse spoken inputs (e.g., "Show train schedules for Berlin in German"). The device automatically detects the user's preferred language from locale settings, browser preferences, user profiles, or query context, eliminating manual language selection. The user device (127), compatible with platforms like desktops, mobile devices, kiosks, and AR/VR headsets, receives and displays broadcasted low-latency live video streams, ensuring accessible and seamless user interaction with touch or voice-enabled controls.

The data acquisition module (101) fetches raw transportation data from service provider servers based on the user's query, whether typed or spoken. It establishes secure connections using protocols like HTTPS or TLS to protect data transmission. The fetched data, including schedules, vehicle types, delays, cancellations, hub assignments, and environmental factors such as weather and traffic, is stored in the real-time transportation database (102). This database serves as a centralized, continuously updated repository, ensuring subsequent modules have access to current information for processing and content generation.

The data processing module (104) preprocesses the raw data by applying AI-based anomaly detection to remove inconsistencies, duplicates, and errors. It filters the data based on transportation mode and a schedule window inferred from the user's query, segments it into structured datasets by provider, hub, hub assignments, and schedule status, and parses the query to identify keywords like transportation mode, hub, and service provider, matching them to datasets in the real-time transportation database (102). The multi-lingual module (106) translates and localizes the processed data into the user's preferred language, using natural language processing and machine translation to ensure contextual accuracy and cultural relevance, such as adapting date formats or idiomatic expressions.

The content generation module (108), in collaboration with the multi-lingual module (106), transforms processed data into a digital content representation of the preferred location in the user's preferred language, automatically detected from device settings, user profiles, or query context. The content includes visual schedules within a 6-hour window, synchronized real-time clocks, operator-specific branding (colors, fonts, logos, animated transitions), interactive elements (touch-enabled controls, voice command integration), real-time vehicle positions overlaid on 3D maps, and personalized passenger information based on user authentication. The multi-lingual module (106) ensures real-time translation and localization of text, voiceovers, and visual elements, enhancing user experience across diverse linguistic regions.

The screen capturing module (114) captures the digital content as low-latency live video streams, augmenting them with overlays such as motion graphics, AR/VR visuals, dynamic advertisements, and banners for significant events. It integrates synchronized background audio tracks with contextual voiceovers in the user's preferred language, processed by the multi-lingual module (106) for linguistic and cultural accuracy, enriching the viewing experience.

The multi-platform streaming module (122) broadcasts the live video streams to digital platforms, including social media, OTT platforms, kiosks, TVs, and smart devices, using low-latency protocols like WebRTC and custom RTMP configurations. It employs edge computing for reduced latency and scalability, delivering streams in a continuously updating news feed format with scrolling text, animated transitions, and real-time schedule updates within a 6-hour window. The multi-lingual module (106) ensures the news feed content is tailored to the user's query and presented in their preferred language with accurate translation and cultural adaptation.

The encoding and streaming preparation module (118) encodes video streams into formats like H.264, H.265, and VP9, segments them for adaptive bitrate streaming, and encrypts them using advanced digital rights management (DRM) and blockchain-based integrity verification to ensure secure delivery across platforms.

The monitoring and scalability module (124) oversees system performance by monitoring streaming performance, network traffic, and user engagement. It implements auto-scaling mechanisms based on predictive traffic analysis and uses AI-driven self-healing algorithms to detect and mitigate streaming anomalies, ensuring reliable operation under varying loads.

The real-time transportation database (102) stores raw transportation data, including schedules, vehicle types, hub assignments, delays, cancellations, weather, traffic feeds, and passenger or cargo traffic statistics. Continuously updated, it provides quick access to accurate data for all modules, supporting real-time processing and content generation.

Figure 2:
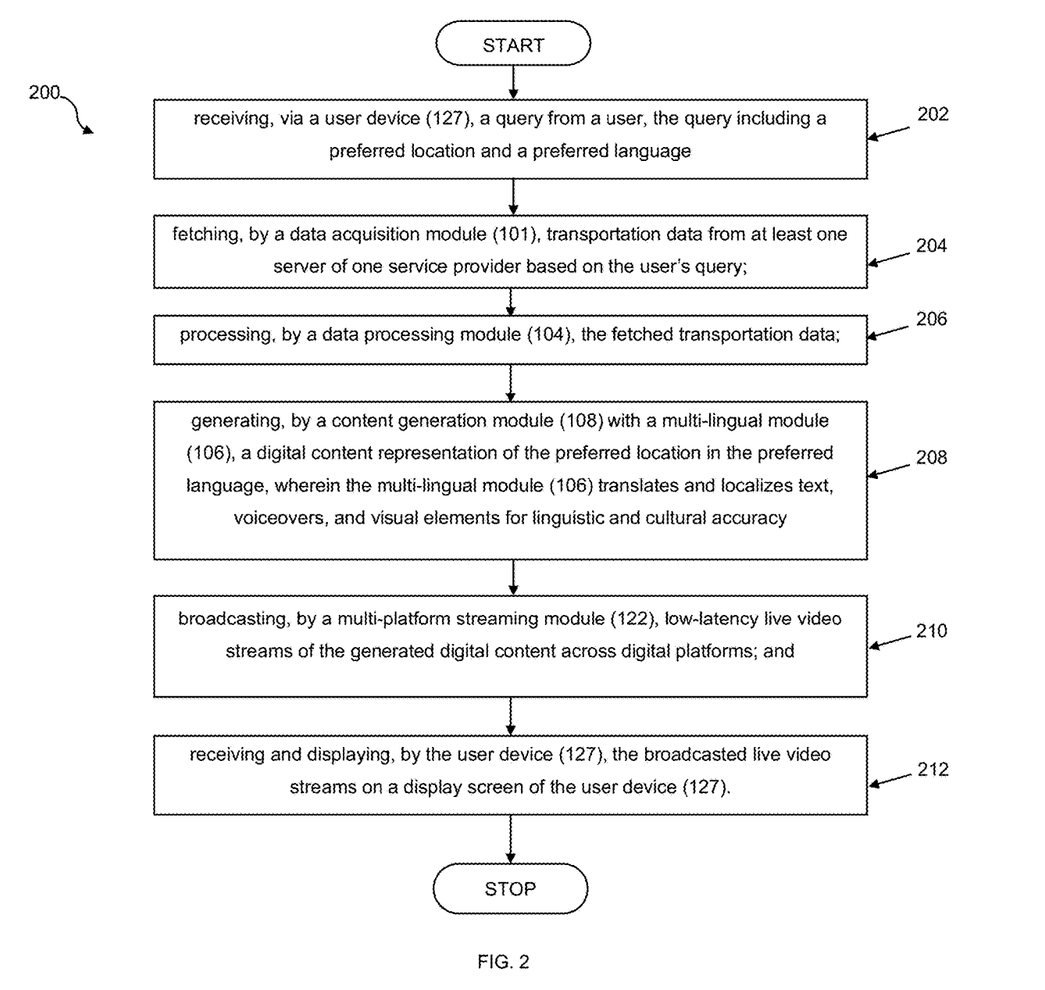
FIG. 2 illustrate a method for real-time video streaming of transportation in accordance with an embodiment of the present disclosure.

FIG. 2 illustrate a method for real-time video streaming of transportation information, in accordance with an embodiment of the present disclosure.

At step (202), the method (200) comprises receiving, via a user device (127), a query from a user, said query including a preferred location and a preferred language.

At step (204), the method (200) comprises fetching, by a data acquisition module (101), transportation data from at least one server of one service provider based on the user's query.

At step (206), the method (200) comprises processing, by a data processing module (104), the fetched transportation data.

At step (208), the method (200) comprises generating, by a content generation module (108) with a multi-lingual module (106), a digital content representation of the preferred location in the preferred language, wherein the multi-lingual module (106) translates and localizes text, voiceovers, and visual elements for linguistic and cultural accuracy.

At step (210), the method (200) comprises broadcasting, by a multi-platform streaming module (122), low-latency live video streams of the generated digital content across digital platforms.

At step (212), the method (200) comprises receiving and displaying, by said user device (127), the broadcasted live video streams on a display screen of said user device (127).

Figure 3A:
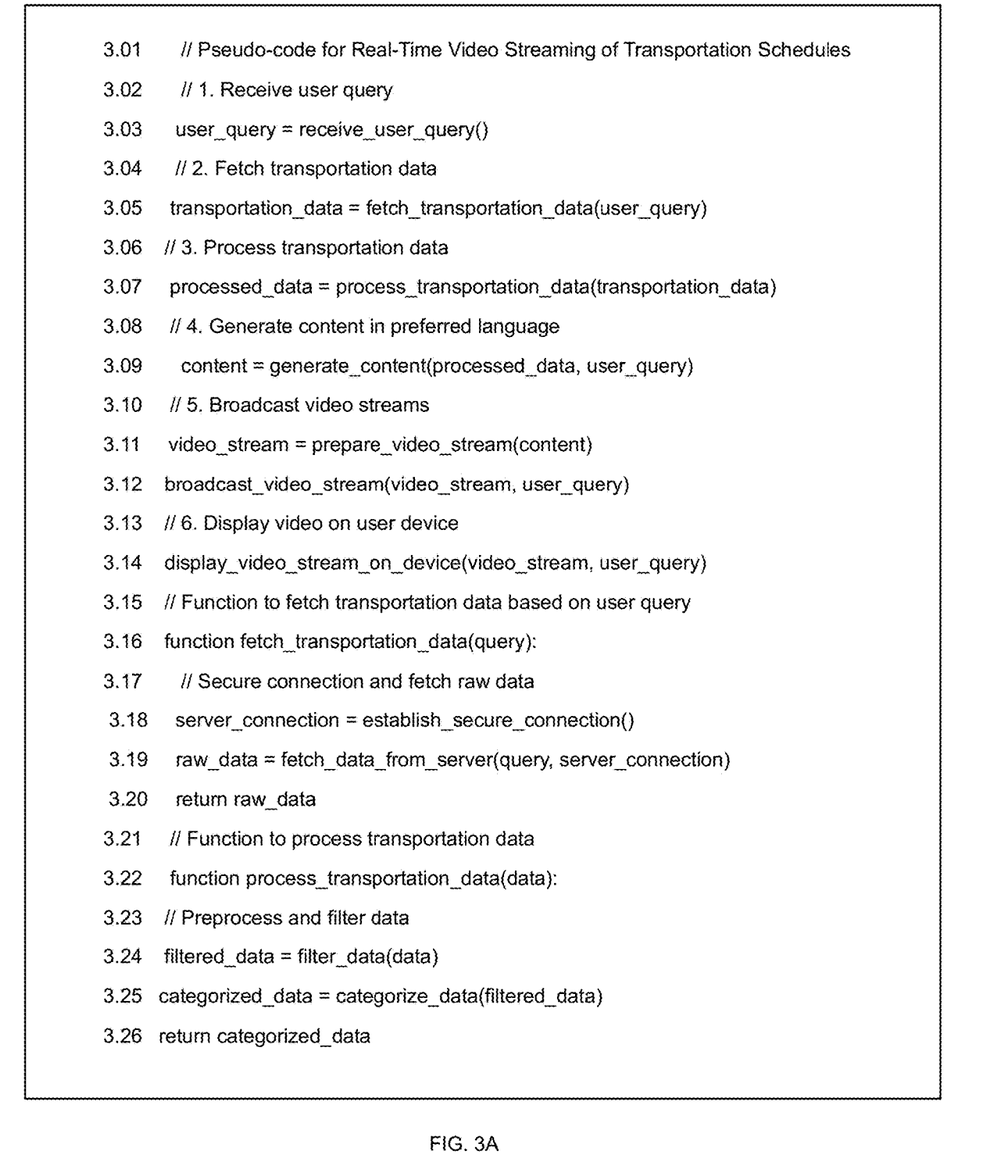
FIGS. 3A and 3B illustrate the pseudo-code depicting the working of a system for real-time video streaming of transportation.
Figure 3B:
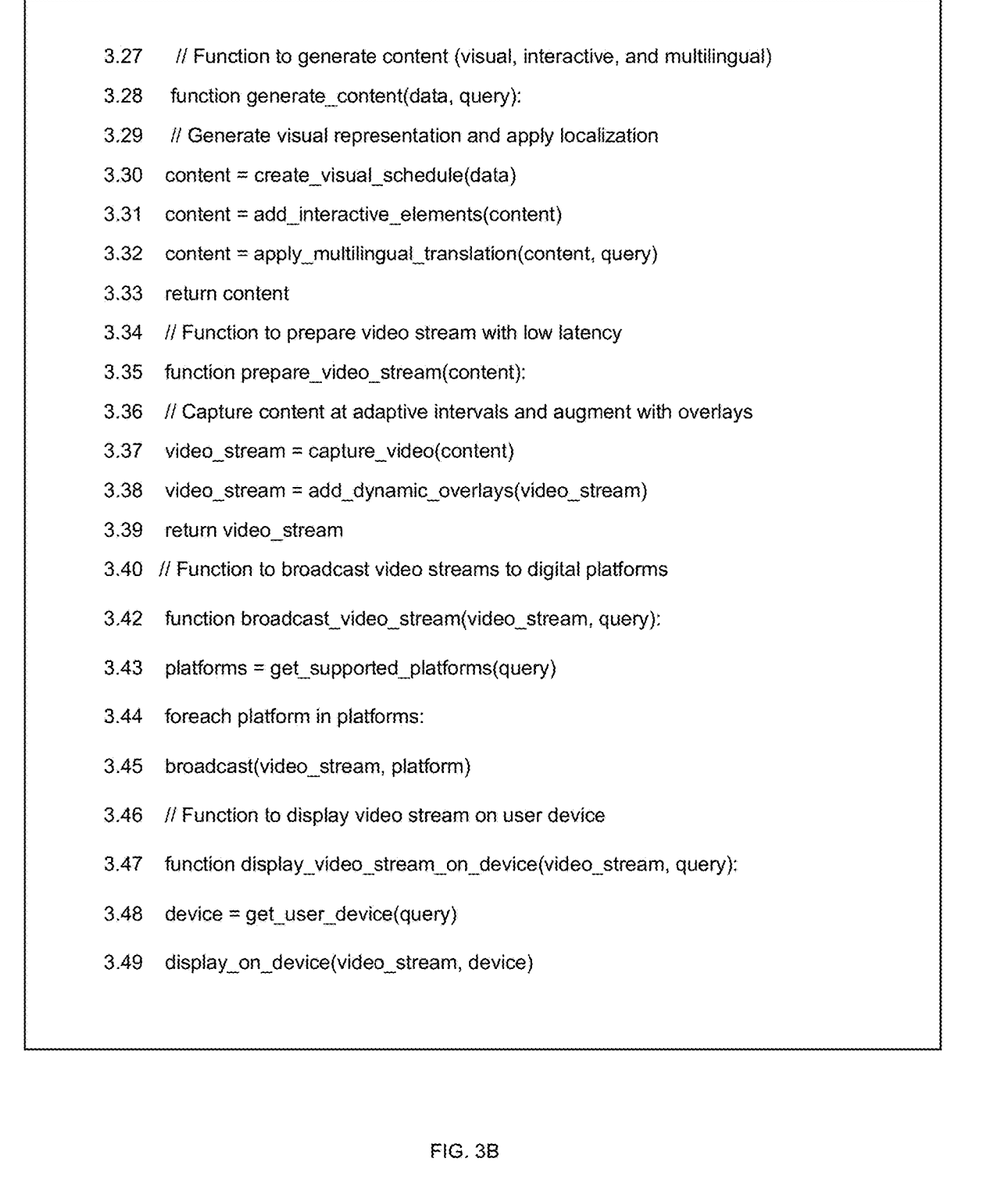

FIGS. 3A and 3B illustrate the pseudo-code depicting the working of a system for real-time video streaming of transportation.

Figure 4:
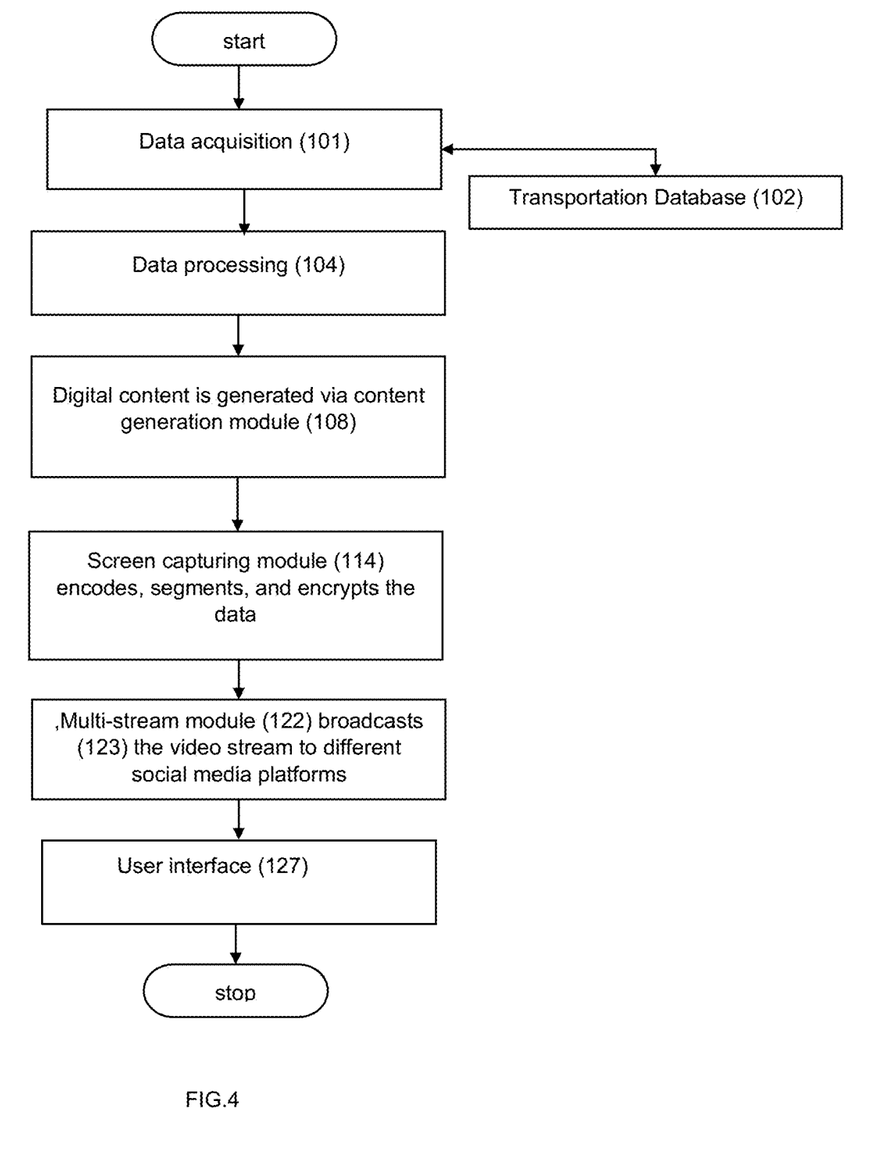
FIG. 4 illustrates a workflow showing the entire working of the system, in accordance with an embodiment of the present disclosure.

FIG. 4 provides the workflow for real-time video streaming of transportation schedules begins by receiving the user's query, which includes their preferred location and language. The system then fetches transportation data by establishing secure connections with service provider servers. This raw data is processed by applying filters and categorizing it into structured datasets. The processed data is then used to generate digital content, including visual schedules and interactive elements, in the user's preferred language using a multilingual module. This content is captured as a video stream, augmented with dynamic overlays and contextual audio, and broadcast across multiple digital platforms using low-latency protocols. Finally, the video stream is displayed on the user's device, ensuring compatibility with the query's specifications and language preferences.

Figure 5:
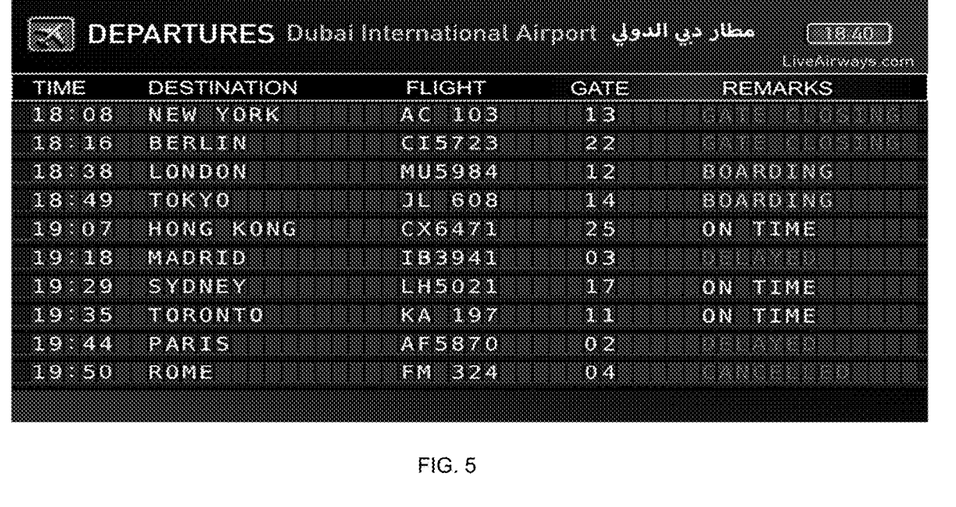
FIG. 5 depicts a screenshot of a departures board flight information, in accordance with the present disclosure.

FIG. 5 depicts a departures board for Dubai International Airport, displaying flight information in both English and Arabic. It lists departure times, destinations (e.g., New York, Tokyo, Sydney), flight numbers, gate numbers, and remarks (e.g., Gate Closing, Boarding, On Time, Delayed, Cancelled). The data shown on the board is related to the current time is 18:40, and the board features a real-time clock, status indicators, and a dynamic layout with scrolling text.

In one embodiment, the system (100) for real-time video streaming of transportation operates at a multi-modal travel hub (e.g., a combined airport, train station, and ferry port), where the data acquisition module (101) securely collects real-time data from transportation database and IoT sensors for road (buses, taxis), marine (ferries), rail (trains), and air (flights), including schedules, GPS positions, and weather feeds; the data processing module (104) cleans and maps this data to vehicle/vessel/flight identifiers, using AI to predict delays (e.g., a 20-minute train delay); the content generation module (108) creates multilingual digital content with operator branding (e.g., Delta's logo), 3D map overlays showing a taxi's route, a ferry's harbour position, a train's progress, and a flight's trajectory, displayed on a touch-enabled kiosk with voice command support; and the screen capturing (114) and multi-platform streaming (122) modules broadcast these streams to IoT-enabled screens, adjusting quality for devices like mobile phones or AR headsets, with low-latency WebRTC protocols ensuring real-time updates accessible via search by operator or travel hub name.

In another embodiment, the system (100) is designed to support multiple transportation modes, including road, waterways, and airways, providing real-time video streaming for each mode. The data acquisition module (101) fetches transportation data specific to each mode, such as vehicle types, schedules, delays, cancellations, and hub assignments. For road transport, the system can display live video feeds from traffic cameras or onboard vehicle cameras, showing real-time traffic conditions or vehicle locations. For waterways, it can broadcast live data from ships, vessels, or ports, including departure times, delays, and docking information. For airways, the system provides live video streams from airports, showing gate departures, security updates, or flight statuses. Additionally, the system can integrate gate-specific departure information, dynamically updating the user with details on their flight or transport vehicle's departure time, gate, and any potential delays. By incorporating these various transportation modes, the system offers comprehensive, real-time updates and visual representations across multiple travel platforms, enhancing the user's ability to stay informed on their preferred mode of transportation.

In an embodiment, the system (100) is configured to automatically detect and switch to the language preferred by the user device (127) without requiring explicit input from the user. Upon initialization, the system retrieves the device's locale settings, browser language preferences, or user profile data to identify the language preference. The system then generates and broadcasts the video streams in the detected language, ensuring seamless content delivery based on the user's device configuration. If no specific language is configured, the system defaults to a widely used language, such as "English," or a hub-specific language, ensuring that the user receives content in a comprehensible format. This embodiment provides a personalized and efficient user experience by automatically aligning the system's language output with the device's configuration.

In an embodiment, the system offers multilingual support for all textual content displayed on the user interface. Users can select their preferred language from a list of available options, which triggers the system to automatically translate and display all travel-related information in the chosen language. This includes real-time updates on transportation schedules, vehicle positions, traffic conditions, and any other relevant data. The language adaptation feature is powered by machine learning models and language-specific APIs, ensuring accurate and contextually appropriate translations. Text layouts are customized to suit the syntax and readability requirements of each language, including considerations for text directionality, such as right-to-left for languages like Arabic. This ensures that the information is accessible and understandable to a global audience.

In an embodiment, the system (100) integrates multilingual voiceover capabilities that are synchronized with the video stream. This voiceover narrates key information such as travel schedules, delays, and vehicle locations in the selected language. The system utilizes advanced text-to-speech (TTS) technology that adjusts speech characteristics, such as tone, pitch, and speed, based on user preferences. This provides an alternative to reading text, making the system more accessible for users who prefer auditory content.

In an embodiment, for users in non-English-speaking regions, such as India, the system (100) allows users to select their preferred language. Upon selection, both the displayed text and the voiceover switch to the chosen language, providing a consistent and accessible experience. The system ensures that users with hearing impairments or those who prefer auditory content can still stay informed and follow along with real-time travel data in their selected language.

In an embodiment, the system (100) is designed to accommodate users with visual impairments, such as low vision or blindness, by integrating screen reader technology. All textual content, including transportation schedules, route assignments, and live updates, is made accessible through auditory feedback. The system also describes images, maps, and other visual content in detail, providing users with a comprehensive understanding of the data without needing to see the text.

In an embodiment, the system (100) offers high contrast options for users with partial vision, enhancing the visibility of text and background. The system allows text to be dynamically resized or bolded to meet individual vision needs. These features help users with limited vision interact comfortably with the system's visual content, minimizing strain and improving readability.

In an embodiment, the system (100) provides full auditory descriptions of any visual elements, such as route maps, live vehicle positions, and other visual data, for users with total blindness. The audio narration is synchronized with the video stream, ensuring users receive timely and relevant information. This allows visually impaired users to fully engage with transportation data and make informed decisions during their travels.

In an embodiment, the system (100) can be fully navigated through auditory cues and voice commands, allowing users who cannot rely on sight to interact with the platform. Users can adjust settings, select transportation modes, and access information using voice instructions, providing a hands-free and inclusive experience for individuals with low vision or blindness.

In an embodiment, the system (100) is configured to support multiple transportation modes, including airways, roadways, and waterways. This enables the system to provide real-time updates across different transport modes, allowing users to make informed decisions based on their selected mode of transport, ensuring that the system can cater to diverse travel needs.

In an embodiment of the system (100) for real-time video streaming of transportation schedules, the user device (127) accepts queries, including a preferred location and language, via typed text or voice commands; typed queries are entered through a text interface, while voice queries are processed using speech recognition and natural language processing to parse inputs like "Show flight schedules for Paris in French"; the multi-lingual module (106) detects the preferred language from query content, device settings, or user profiles, translating and localizing data and content using natural language processing; the data acquisition module (101) fetches transportation data (schedules, delays), processed by the data processing module (104), and the content generation module (108), with the multi-lingual module (106), produces visual schedules and voiceovers in the preferred language, captured as low-latency streams by the screen capturing module (114) and broadcast by the multi-platform streaming module (122) to digital platforms in a news feed format, displayed on the user device (127) with culturally accurate, real-time updates In an embodiment, multiple structures can be created for streaming of the data depending upon the demand of the user. For example, the transportation API data structuring and filtering for video streaming, can have ability to structure and filter transportation API data precisely according to user requirements, ensuring optimized real-time video streaming.

The key data structuring and filtering possibilities include, for instance, for air transportation-wise Data Structuring: Filter flights by specific airports (e.g., Dubai International, London Heathrow), stream arrivals, departures, and on-ground statuses airport-by-airport and to create airport-specific live streaming feeds or airline-wise data structuring: Filter flights based on specific airlines (e.g., Emirates, Qatar Airways, Delta Airlines), Highlight only flights operated by selected airlines. This is ideal for airline-focused streaming channels or sponsorship-driven live displays: Route-wise Data Structuring, Filter and showcase flights by specific origin-destination routes (e.g., New York→London), focus on key international or regional flight paths, and enables route-specific video content and targeted audience engagement.

The present disclosure provides a system and method for real-time video streaming of transportation information, demonstrated through the following anecdotal examples to illustrate its functionality and practical applications.

In an example use, a business traveller (user) needs to catch a flight from JFK Airport and inputs "JFK Airport" as the location and "German" as the language preference via typed text or voice command (e.g., "Show flight schedules for JFK in German") on his device (127). The data acquisition module (101) fetches flight schedules, delay information, and cancellations from service providers, storing them in the real-time transportation database (102). The data processing module (104), with the multi-lingual module (106), processes and translates the data into German, filtering and categorizing it by flight number, departure time, gate assignments, and delays. The content generation module (108), aided by the multi-lingual module (106), creates a live video stream in German, displaying real-time flight positions, estimated arrival times, departure gates, and changes, captured by the screen capturing module (114). The multi-platform streaming module (122) broadcasts this stream in a news feed format across platforms, and the user's device (127) displays real-time updates, ensuring awareness of schedule changes.

In another example, a commuter (user) using the tram system inputs "City Center Tram Stop" and "Italian" as the location and language via typed text or voice command on his device (127). The data acquisition module (101) retrieves tram schedules, vehicle types, and delay data, stored in the real-time transportation database (102). The data processing module (104), with the multi-lingual module (106), processes and translates the data into Italian, categorizing it by tram line, status, and estimated arrival times. The content generation module (108), with the multi-lingual module (106), generates a video stream in Italian showing real-time tram positions and upcoming stops, captured by the screen capturing module (114). The multi-platform streaming module (122) broadcasts this in a news feed format with scrolling text and animated transitions, and the user's device (127) displays interactive updates on arrival times and detailed schedules.

In an example use, a passenger (user) on a long-distance bus journey inputs "Route 101 Bus" and "English" as the location and language via typed text or voice command on her device (127). The data acquisition module (101) fetches real-time data, including bus location, delay times, and stops, stored in the real-time transportation database (102). The data processing module (104), with the multi-lingual module (106), processes and translates the data into English, categorizing it by bus number and schedule status. The content generation module (108), with the multi-lingual module (106), creates a video stream in English showing the bus's position, stops, and delays, captured by the screen capturing module (114). The multi-platform streaming module (122) broadcasts this stream, and the user's device (127) displays interactive features like next stop details and schedule changes.

In an example use, a tourist (user) visiting a city inputs "Downtown Metro Station" and "French" as the location and language via typed text or voice command on her device (127). The data acquisition module (101) retrieves metro schedules and real-time data, stored in the real-time transportation database (102). The data processing module (104), with the multi-lingual module (106), processes and translates the data into French, categorizing it by train line and delays. The content generation module (108), with the multi-lingual module (106), creates a video stream in French showing train positions and disruptions, captured by the screen capturing module (114). The multi-platform streaming module (122) broadcasts this to platforms like YouTube, and the user's device (127) displays updates on arrivals and delays.

In an example use, a ferry passenger inputs "Harbor Dock" and "Portuguese" as the location and language via typed text or voice command on her device (127). The data acquisition module (101) fetches ferry schedules, assignments, and weather data, stored in the real-time transportation database (102). The data processing module (104), with the multi-lingual module (106), processes and translates the data into Portuguese, categorizing it by ferry line and delays. The content generation module (108), with the multi-lingual module (106), creates a video stream in Portuguese showing the ferry's position and weather updates, captured by the screen capturing module (114). The multi-platform streaming module (122) broadcasts this to platforms like YouTube, and the user's device (127) displays real-time status and schedule changes.

In an operative configuration, the system (100) integrates a data acquisition module (101) to collect live transportation data from service provider APIs, IoT sensors, and databases, including schedules, delays, and environmental factors, stored in the real-time transportation database (102). The data processing module (104), with the multi-lingual module (106), applies AI-driven anomaly detection and translates data into the user's preferred language. The content generation module (108), with the multi-lingual module (106), creates interactive, multilingual video content with dynamic overlays, 3D route visualizations, and predictive insights, captured by the screen capturing module (114). The multi-platform streaming module (122) broadcasts low-latency streams in a news feed format across digital platforms, displayed on the user device (127).

Advantageously, the system combines real-time, historical, and predictive data, delivering accurate, multilingual transportation updates. It offers customizable content with branded overlays and 3D maps for buses, trains, ferries, and flights, using advanced encoding, adaptive bitrate streaming, and secure DRM protocols. The monitoring and scalability module (124) ensures performance by auto-scaling and mitigating anomalies with AI-driven self-healing, providing a reliable, immersive experience across devices.

The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described hereinabove has several technical advantages, including, but not limited to, a system and method for real-time video streaming of transportation information, which:

- optimize real-time data integration from diverse transportation modes (road, rail, air, water), processing and displaying relevant schedule, departure, arrival, and gate information in a unified interface;
- provides flexibility to build customized transportation streams based on user needs;
- provides dynamic updating to ensure real-time accuracy;
- is scalable for global, regional, transport-specific, video streaming operations;
- Employ AI-driven predictive analytics to provide anticipatory updates, ensuring users receive timely information about delays, route changes, or cancellations;
- enable cross-platform compatibility, allowing seamless data streaming and updates on various devices without relying on third-party applications, enhancing user accessibility and convenience;
- incorporate dynamic content overlays, such as maps, real-time vehicle tracking, and live updates, for an immersive user experience across different transportation systems;
- facilitate localization by automatically adjusting content to the user's geographical location and language preferences, ensuring a personalized and context-relevant experience for global users;
- adopt low-latency streaming techniques to minimize delays, ensuring users receive live updates promptly, even in high-demand scenarios;
- implement robust security measures, including encrypted data transmission and secure authentication, safeguarding user privacy and maintaining data integrity throughout the process;
- support easy scalability of the system by incorporating flexible architecture, ensuring efficient handling of growing user demands and expanding data sources as transportation networks evolve; and
- integrate system self-healing capabilities that automatically detect and resolve issues like streaming interruptions or system overloads, ensuring uninterrupted service during peak times or technical disruptions.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system (100) for real-time video streaming of transportation information, said system (100) comprising:
    a user device (127) to allow a user to input a query, which includes a preferred location and a preferred language, to retrieve video streams;
    a data acquisition module (101) to fetch transportation data from at least one server of one service provider server based on said user's query;
    a data processing module (104) to process said fetched transportation data;
    a content generation module (108) to receive said processed transportation data and generate digital content representation of said preferred location in said preferred language, wherein the content generation module (108) is to:
        generate visual representations of transportation schedules within a 6-hour window;
        include real-time clocks synchronized with global time zones;
        apply operator-specific branding with colors, fonts, logos, and animated transitions;
        provide interactive elements including touch-enabled controls and voice command integration;
        overlay real-time positions on 3D maps; and
        present personalized passenger information based on user authentication;
    a multi-platform streaming module (122) to broadcast live video streams across digital platforms; and
    wherein said user device (127) is to receive and display the broadcasted live video streams on its display screen.

2. The system (100) of claim 1, wherein the data acquisition module (101) is to:
    establish secure connections with service provider servers using secure protocols;
    fetch raw transportation data including schedules, hub assignments, vehicle types, delays, cancellations, and environmental factors based on the user's query; and
    store the raw data in the real-time transportation database (102).

3. The system (100) of claim 1, wherein the data processing module (104) is to:
    preprocess and filter the raw transportation data by applying AI-based anomaly detection to remove inconsistencies, duplicates, and errors;
    filter the data based on transportation mode and a schedule window inferred from the user's query;
    segment and categorize the data into structured datasets based on provider, hub, hub assignments, and schedule status; and
    convert the filtered data and categorised data into preferred language selecting in the user's query based on multi-lingual module (106) and is further configured to parse the user's query to:
    identify the transportation mode by analysing keywords and context;
    extract the hub and service provider; and
    match the query to corresponding datasets in the real-time transportation database (102).

4. The system (100) of claim 1, wherein said content generation module (108) is to work with a multi-lingual module (106) to generate digital content in the user's preferred language, automatically detected from device locale settings, user profile preferences, or query context, with the multi-lingual module (106) enabling real-time translation and localization of text and visual elements.

5. The system (100) of claim 1, wherein said screen capturing module (114) is to:
capture the digital content as low-latency live video streams at adaptive intervals;
augment the streams with overlays including motion graphics, AR/VR visuals, dynamic advertisements, and banners for significant events; and
integrate synchronized background audio tracks with contextual voiceovers in the user's preferred language.

6. The system (100) of claim 1, wherein the multi-platform streaming module (122) is to:
broadcast the low-latency video streams to digital platforms (123), including social media platforms, kiosks, OTT platforms, TVs, and smart devices in a continuously updating news feed format; said news feed format to include:
real-time updates of transportation schedules within a 6-hour window in a tabular or ticker-style layout;
scrolling text, animated transitions, and highlighted status changes; and
user-specific content tailored to the query and delivered in the user's preferred language via the multi-lingual module (106), which ensures precise translation, localization, and cultural adaptation of text, voiceovers, and graphics;
use low-latency protocols, including WebRTC and custom RTMP configurations; and
support edge computing delivery for reduced latency and enhanced scalability.

7. The system (100) of claim 1, wherein said user device (127) is configured to:
allow the user to input a query relating to a hub and provider; and
retrieve corresponding video streams in the user's preferred language, as determined by a multi-lingual module (106), which automatically adapts content to linguistic preferences without manual language selection, wherein detecting said user's preferred language comprises:
querying device locale settings, browser language preferences, or digital platform profile settings;
retrieving stored language preferences from the user profile in the real-time transportation database (102);
analysing query context or user interaction patterns to infer language preferences; and
defaulting to a widely used or hub-specific language if no preference is detected, with the multi-lingual module (106) providing fallback translation options.

8. The system (100) of claim 1, wherein said real-time transportation database (102) contains raw transportation data including schedules, hub assignments, vehicle types, delays, cancellations, live positions, weather, traffic feeds, and passenger or cargo traffic statistics.

9. The system (100) of claim 1, wherein said data processing module (104) is to generate predictive insights (107) including estimated arrival/departure times, delay durations, and hub reassignments within a 6-hour window.

10. The system (100) of claim 1, further comprising an encoding and streaming preparation module (118) to:
encode video streams into H.264, H.265, and VP9 formats (119);
segment streams for adaptive bitrate streaming; and
encrypt the segmented streams using advanced DRM and blockchain-based integrity verification; and
a monitoring and scalability module (124) to:
monitor streaming performance, network traffic, and user engagement;
implement auto-scaling mechanisms based on predictive traffic analysis; and
detect and mitigate streaming anomalies using AI-driven self-healing algorithms.

11. The system (100) of claim 1, wherein said digital content is accessible via queries, clickable links, QR codes, or on devices including desktops, mobiles, AR/VR headsets, kiosks, OTT platforms, TVs, and hub-specific displays, and said digital content and said user device (127) comply with accessibility standards, including WCAG compliance for users with disabilities.

12. The system (100) of claim 1, wherein said multi-platform streaming module (122) and the encoding and streaming preparation module (118) are to:
optimize video streams for low-bandwidth environments; and
ensure compatibility with devices, including wearables, IoT devices, smartphones, tablets, desktops, TVs, and kiosks.

13. A method (200) for real-time video streaming of transportation information, said method (200) comprising:
receiving, via a user device (127), a query from a user, said query including a preferred location and a preferred language;
fetching, by a data acquisition module (101), transportation data from at least one server of one service provider based on the user's query;
processing, by a data processing module (104), the fetched transportation data;
generating, by a content generation module (108) with a multi-lingual module (106), a digital content representation of the preferred location in the preferred language, wherein the multi-lingual module (106) translates and localizes text, voiceovers, and visual elements for linguistic and cultural accuracy, wherein generating digital content comprises creating visual schedules, real-time clocks, operator branding, interactive elements, 3D route overlays, and personalized overlays in the user's preferred language, with the multi-lingual module (106) providing real-time translation, localization, and cultural adaptation of textual and auditory content for accessibility and relevance;
broadcasting, by a multi-platform streaming module (122), low-latency live video streams of the generated digital content across digital platforms; and
receiving and displaying, by said user device (127), the broadcasted live video streams on a display screen of said user device (127).

14. The method (200) of claim 13, wherein fetching transportation data comprises:
establishing secure connections with service provider servers;
retrieving raw transportation data in JSON, XML, or proprietary formats; and
storing the raw data in a real-time transportation database; and
wherein processing transportation data comprises:
preprocessing and filtering the data by applying AI-based anomaly detection;
filtering based on transportation mode and schedule window; and segmenting and categorizing data based on provider, hub, hub assignments, and schedule status.

15. The method (200) of claim 13, wherein parsing the user's query comprises:
identifying the transportation mode, hub, and provider; and
matching the query to corresponding datasets in the database.

16. The method (200) of claim 13, wherein capturing digital content comprises:
capturing content at adaptive intervals;
augmenting video streams with overlays, AR/VR visuals, and background audio with contextual voiceovers.

17. The method (200) of claim 13, wherein broadcasting video streams comprises:
broadcasting to digital platforms in a news feed format resembling a stock market ticker;
using low-latency protocols and edge computing delivery.

18. The method (200) of claim 13, wherein the news feed format includes:
dynamic, real-time updates of transportation schedules within a 6-hour window;
scrolling text, animated transitions, and highlighted status changes; and
user-specific content in the user's preferred language, enabled by the multi-lingual module (106), which delivers accurate translation, localization, and culturally appropriate presentation of schedules, voiceovers, and visual elements.

* * * * *